United States Patent

Tsuda et al.

[15] 3,663,111
[45] May 16, 1972

[54] SELF LEVELING TRANSIT LEVEL HAVING NOVEL LOCKING MECHANISM

[72] Inventors: Shozo Tsuda; Masanori Nozaki, both of Tokyo, Japan

[73] Assignee: Fuji Koki Kabushiki Kaisha, Kawasaki-shi, Japan

[22] Filed: July 17, 1970

[21] Appl. No.: 55,683

[30] Foreign Application Priority Data

July 31, 1969 Japan..................................44/59997

[52] U.S. Cl..............................356/250, 33/73 D, 350/16
[51] Int. Cl.........................................................G01c 9/12
[58] Field of Search....................356/148, 149, 250; 350/16; 33/69, 73 D, 73 E, 73 R, 70 R

[56] References Cited

UNITED STATES PATENTS 2,997,912   8/1961   Mikic......................................356/250
3,220,297   11/1965  Baker et al..............................356/250

*Primary Examiner*—Ronald L. Wibert
*Assistant Examiner*—Orville B. Chew, II
*Attorney*—Wenderoth, Lind & Ponack

[57] ABSTRACT

A self leveling transit level including a telescope means incorporating therein automatic level line compensator means and means for locking the swinging portion of the compensator means, whereby the telescope may be adapted for use as a transit when the lock means is operative to lock the swinging portion and for use as a level when the lock means is not in operation.

4 Claims, 5 Drawing Figures

PATENTED MAY 16 1972

SHOZO TSUDA and
MASANORI NOZAKI,
INVENTORs

BY Wenderoth.
Lind & Ponack ATTORNEYs

SHOZO TSUDA and
MASANORI NOZAKI,
INVENTORS

SELF LEVELING TRANSIT LEVEL HAVING NOVEL LOCKING MECHANISM

BACKGROUND OF THE INVENTION

1. Field of the Invention

This invention relates to a transit level used for surveying, and more particularly to a highly accurate automatic transit level.

2. Description of the Prior Art

There is known a transit level in which a telescope is movable to serve as a transit so as to effect so-called transit surveying such as the measurement of elevation and horizontal angles while the telescope can be horizontally fixed to serve as a level so as to effect leveling. Such a transit level of the known type, however, has been unsatisfactory in performance either as a transit or as a level.

It is generally difficult to maintain the transit body exactly vertically and more or less error is always encountered in the installation of the transit. Therefore, even if the telescope is fixed with its elevation scale set to 0°, the optical axis of the telescope is not always exactly horizontal and occurrence of more or less error is usually unavoidable.

In addition to the disadvantage which is experienced with the transit level when it is used as a transit, it is required that the transit level be provided with a special mechanism known as lock means for locking the transit body and telescope in a horizontal position, and even the slightest slack or the like in the lock means may result in an increased error of the horizontal position. With the prior art transit level, therefore, it has been very difficult to maintain the optical axis of the telescope exactly horizontal.

The known transit level has further suffered from the following fundamental drawbacks:

a. The irreversibility of the telescope results in an inadequate performance as a transit and great cumbersomeness is involved in the adjustment;

b. The simple mechanical connection employed to fix the telescope to the support frame makes it difficult to maintain a precise level line;

c. The connector means for the telescope causes irregular horizontal errors to be produced every time the connector means is mounted or dismounted, and this makes it impossible to use a bubble tube of high sensitivity for the telescope;

d. The unstable level line results in lack of accord between the level line and the zero point of the elevation protractor, which also results in a lower reliability of the measured elevation.

Accordingly, the known transit level cannot be used for a surveying operation which requires highly accurate and reliable measurement and it has thus been limited in use. In fact, all the transit levels now commercially available are of the simple type which have poor accuracy.

SUMMARY OF THE INVENTION

The present invention contemplates elimination of all these disadvantages and drawbacks inherent in the known transit level. The automatic transit level according to the present invention has a telescope whose body tube incorporates therein an automatic compensator, which automatically corrects the level line of the telescope into a strictly horizontal position even if the body tube itself is not set exactly horizontally or is set with more or less error.

The operating range of the compensator used with the apparatus of the present invention is approximately 10 minutes, and the compensator is provided with an element which can compensate for any inclination of the telescope within that range by moving the optic axis thereof. The role of this compensator element is very important for providing always exact horizontality irrespective of any installation error of the body when the apparatus is used as an automatic level.

However, it is apparent that the presence of such an unstable element will result in a serious functional defect if the apparatus is diverted for use as a transit. For this reason, the automatic transit level of the present invention is further provided with means for locking the aforesaid compensator to maintain the moved optic axis of the telescope immovably fixed, when the device is used as a transit.

Also, the use of the apparatus as a transit requires, of course, that the telescope be rotated at any time as desired. When the telescope is rotated, the compensator incorporated in the body tube thereof is also rotated so that a very great extraneous force is exerted upon the essential part of the compensator. For this reason, miniature ball bearings must be used for the pivots of the compensator to firmly hold the pendulum in order not only to maintain the accuracy of the optical axis but also to prevent the occurrence of any unexpected trouble or accident. The pendulum is secured by certain means to be described and a compensation prism is always set to the proper position when the apparatus is used as a transit.

It is therefore a primary object of the present invention to provide means for readily locking the compensator means when the apparatus of the invention is used as a transit.

These and other objects and advantages of the present invention will become fully apparent from the following description taken in conjunction with the accompanying drawings showing a preferred embodiment of the invention.

DESCRIPTION OF THE PREFERRED EMBODIMENTS

Figure 1:
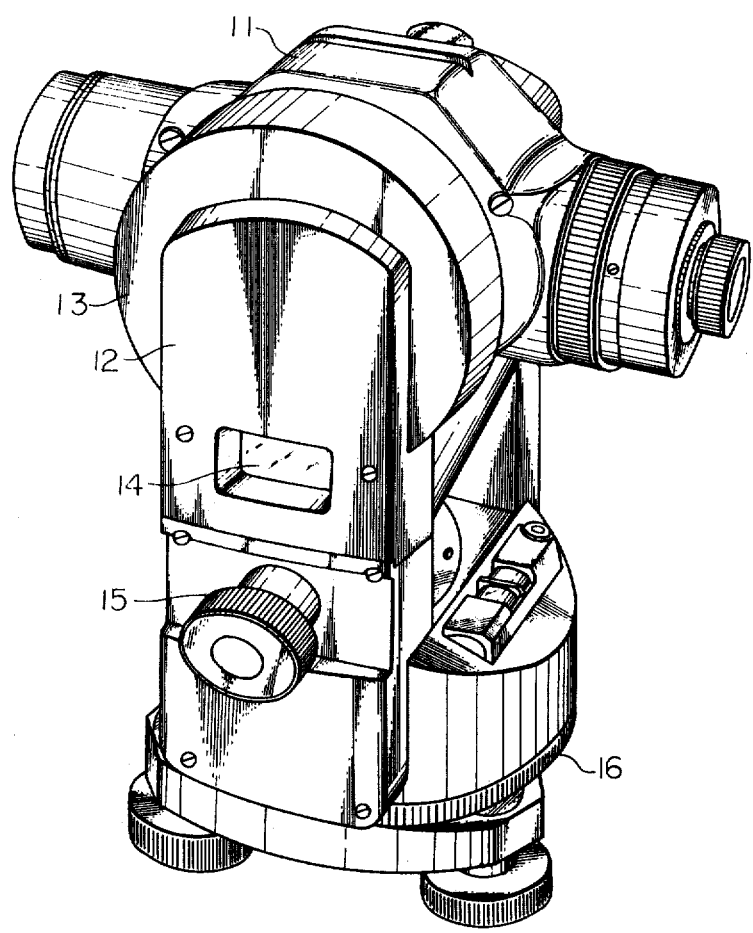
FIG. 1 is a perspective view of the automatic transit level according to the present invention.

Referring to FIG. 1, there is shown the apparatus of the present invention as it is used as a transit. The apparatus includes a telescope 11 supported in the known manner by a support frame 12, a housing 13 for an elevation protractor, a window 14 for indicating the elevational protraction, a knob 15 for locking the telescope 11 when it is used as a level, and a rotary ring 16 for indicating the horizontal protraction.

Figure 2:
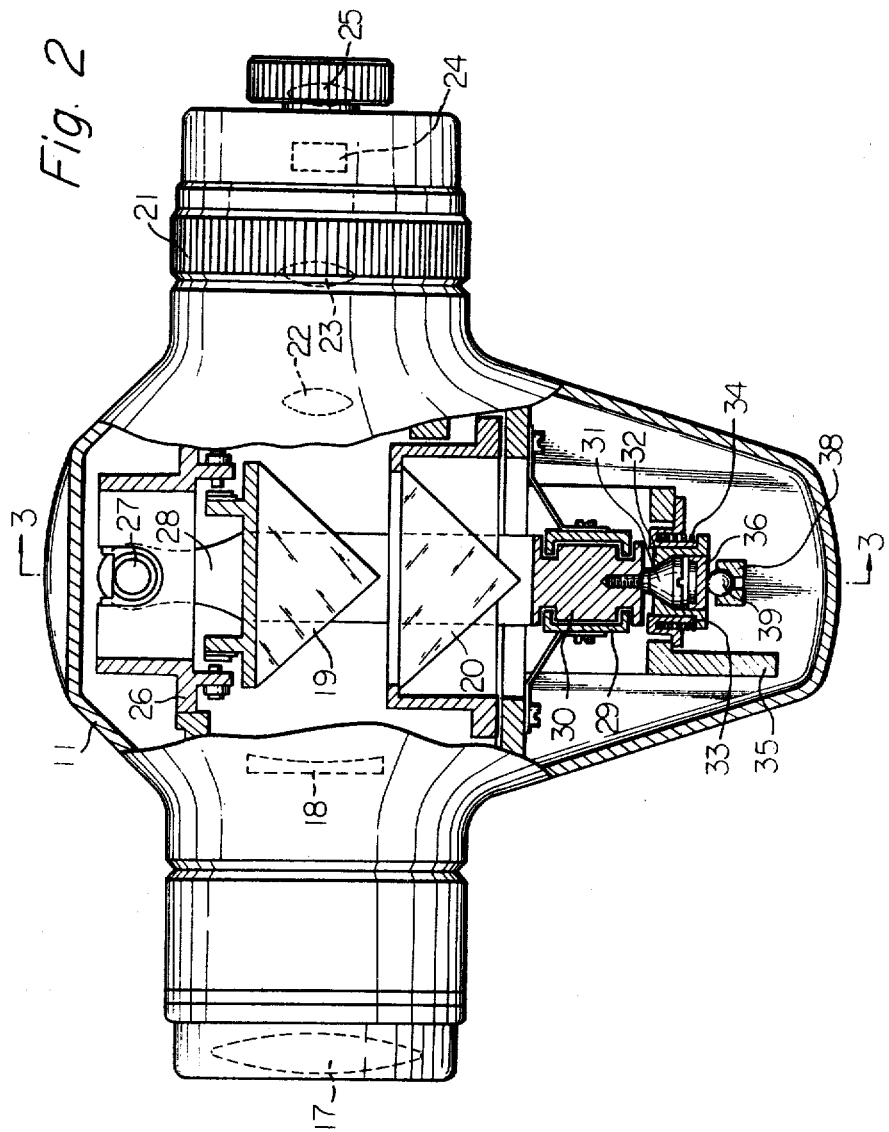
FIG. 2 is a partly broken-away and partly cross-sectional view showing the telescope used with the apparatus of FIG. 1.

As seen from FIG. 2, light entering through a first objective 17 in the telescope 11 passes through a second objective 18, and then is directed downwardly by one of the sides of a compensation prism 19 supported in a manner to be described. The downwardly directed light reaches a fixed prism 20 and is refracted therein in the known manner so that the light is directed upwardly toward the other side of the compensation prism 19, where the light is laterally directed to pass through a focusing lens 22 movable back and forth by a focusing knob 21, and further through an erect lens 23, a focusing mirror 24 and an ocular 25 to finally reach the eye of the observer.

Frame 26 is provided within the body tube and pivot pins 27 are disposed in the upper portion of the frame 26. A depending plate member 28 is mounted for swinging movement on each pivot pin 27. The pair of plate members 28 hold the compensation prism 19 and a weight 30 therebetween, the weight 30 being embraced by air dampers 29. A conical clutch member 31 having a threaded, reduced end portion is screwed into the weight 30 at the lower side thereof. The plate members 28, compensation prism 19, weight 30 and conical clutch member 31 together constitute the vibratory portion of an automatic level line compensator means whose function will be described.

Figure 3:
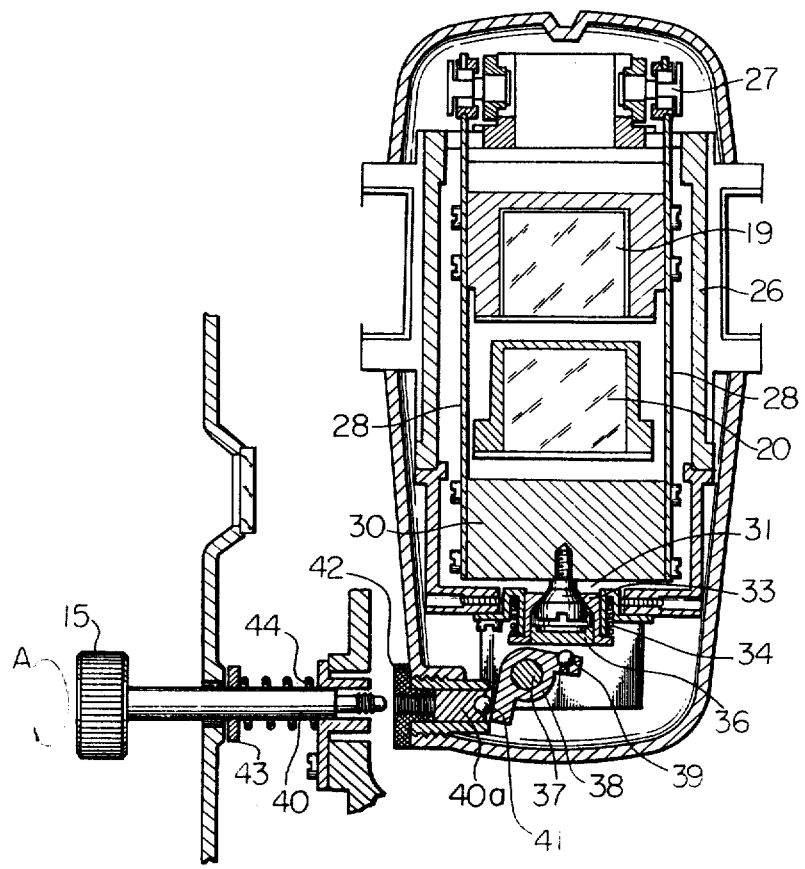
FIG. 3 is a cross-sectional view taken substantially along line 3—3 of FIG. 2.

A clutch socket 32 which is slidably fitted in a sleeve 33 has an outwardly extended lower portion, to which a spring 34 is secured at one end thereof. The other or upper end of the spring 34 is engaged with the sleeve 33, which in turn is suitably secured to a sleeve mounting plate 35 attached to the frame 26. The spring 34 normally urges the clutch socket 32 downwardly, so that the clutch socket 32 maintains engagement with the conical clutch member 31 as shown in FIGS. 2 and 3 unless any extraneous pressure is imparted to the clutch socket 32. As a result, the clutch socket 32 locks the weight 30 and accordingly the compensation prism 19.

The clutch socket 32 has a bottom plate 36 fitted thereto. The bottom plate 36 is engaged by a ball 39 partly received in one of the arms of a substantially L-shaped lever 38 pivotally mounted on a pivot pin 37. The other end of the L-shaped lever 38 is engaged by a ball 41 partly received in one end face of a short rod 40a.

When the apparatus is used as a transit, the short rod 40a is moved leftwardly, as viewed in FIG. 3, by the urge of the spring 34 via the lever 38, until the other end of the rod 40a is brought into abutment with a stop member 42 having an internally threaded hole formed therethrough. When the short rod 40a thus engages the stop member 42, the clutch socket 32 is sufficiently lowered to firmly lock the conical clutch member 31.

A rod 40, which includes an externally threaded end portion complementary to the internally threaded hole in the stop member 42 and an intermediate flange 43, extends through the support frame 12. A coil spring 44 is wound on the rod 40 between the flange 43 and the wall portion formed by the support frame 12. The coil spring 44 normally urges the rod 40 leftwardly as viewed in FIG. 3. The other end of the rod 40 has the previously mentioned knob 15 mounted thereon.

Figure 4:
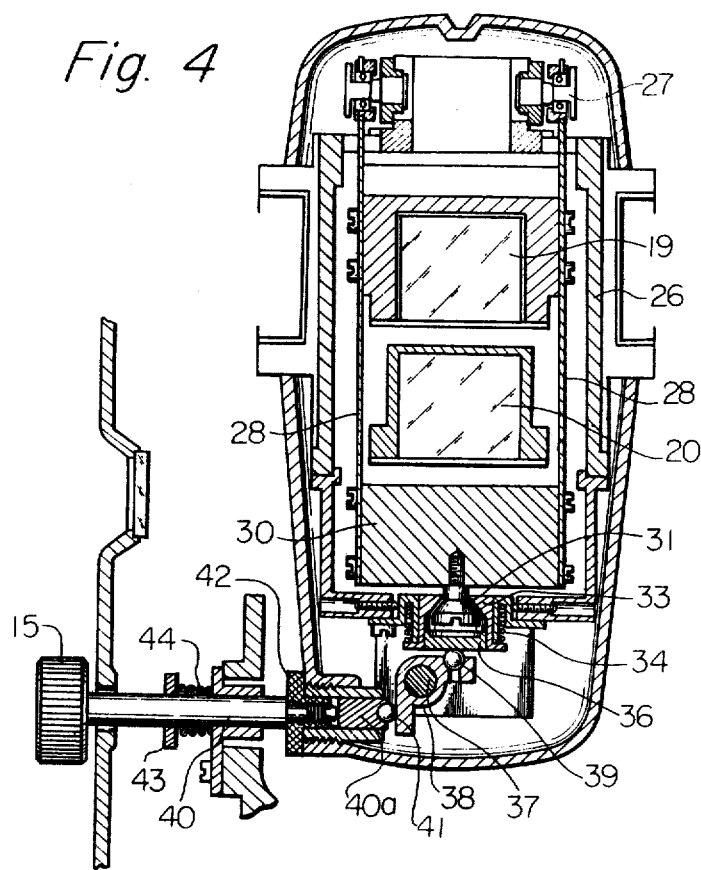
FIG. 4 is a cross-sectional view similar to FIG. 3 but showing the apparatus in the position as it is used as a level.
Figure 5:
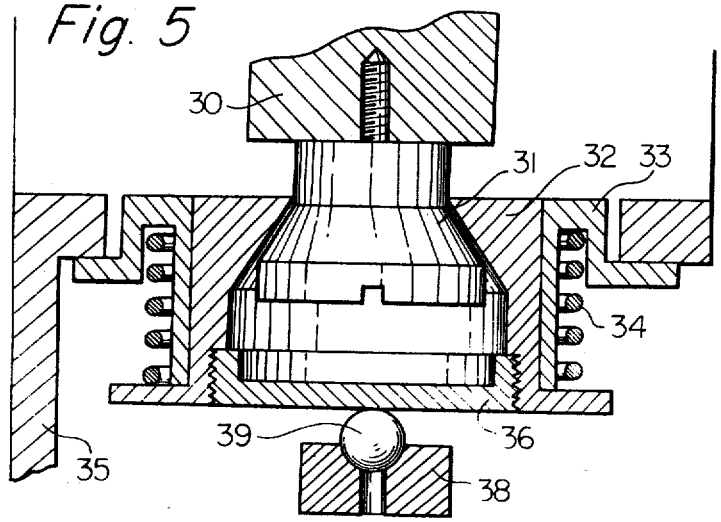
FIG. 5 is an enlarged sectional view of the essential portion of the apparatus as it is used as a level.

When the rod 40 is rotated and moved rightwardly against the force of the spring 44 until the externally threaded end portion of the rod 40 is brought into engagement with the internally threaded hole in the stop member 42, the threaded end portion of the rod 44 forces the short rod 40a rightwardly (FIG. 4). As the result, the L-shaped lever 38 is rotated counter-clockwise about the pivot 37. This in turn causes the clutch socket 32 to be raised against the force of the springs 34, whereby the clutch socket 32 is disengaged from the clutch member 31. Thus, the lock means is released to allow the swinging portion to swing so as to operate the automatic compensator means (FIG. 5).

Referring to FIGS. 2 and 3, the conical clutch member 31 is engaged with the clutch socket 32 by the the spring 34. In this position, the weight 30 is fixed and accordingly, the compensation prism 19 held by and between the plate members 28 which also holds the weight 30 between is also fixed. This means that the function of automatic level line compensation of the telescope 11 is inoperative, and accordingly the telescope 11 serves in the same way as the ordinary transit telescope having a fixed optical axis and can effect transit without causing any flickering of images.

The apparatus of the present invention described above can also be used as a level simply by the following procedures. The body tube of the telescope 11 is first adjusted so that the level marks (not shown) provided in the body tube and support frame 12 are brought into accord with each other, and then the telescope is disposed substantially horizontally. The knob 15 is then depressed and rotated in the direction as indicated by the arrow in FIG. 3. Thus, as previously described, the clutch socket 32 is raised in the sleeve 33 to disengage the clutch 31, whereby the prism 19 is allowed to swing in the body tube.

Therefore, even if the body tube is slightly inclined when the telescope 11 has been set in position, the level line of the telescope can be automatically compensated for and maintained exactly horizontal because the line passing the apex of the compensation prism 19 and the center of the pivots 27 is always maintained exactly vertical. Thus, the apparatus can work as a level.

While the present invention has been shown and described with respect to a preferred embodiment thereof, the present invention is not limited thereto and it will be apparent to those skilled in the art that various changes and modifications may be made therein without departing from the scope of the invention as defined in the appended claims.

What is claimed is:

1. A self leveling transit level comprising a telescope and a frame member supporting said telescope, the body tube of said telescope having incorporated therein self leveling level line compensator means including a swinging portion swingably mounted in said telescope and including a first prism fixedly mounted on said swinging portion, and a weight fixed to said swinging portion, a stationary prism fixedly interposed between the first prism and said weight, and lock means for locking said swinging portion comprising a clutch member extending downwardly from the underside of said weight, a clutch socket engageable with said clutch member, and means for releasing the engagement between said clutch member and said clutch socket, whereby the optical axis of said telescope can be fixed so as to allow said telescope to serve as a transit telescope when said lock means is operative to lock said swinging portion, and said compensator means compensates for any inclination of said optical axis of said telescope so as to allow said telescope to serve as a level telescope when said lock means releases said swinging portion.

2. A self leveling transit level as claimed in claim 1 wherein said clutch socket has a recess with a shape complementary to said clutch member, a sleeve in which said clutch socket is slidably mounted, a spring means attached to said sleeve normally urging said clutch socket downwardly into engagement with said clutch member, and a lever positioned below said clutch socket and engageable therewith for disengaging said clutch member from said clutch socket upon actuation of said lever to move said clutch socket upwardly.

3. A self leveling transit level as claimed in claim 2 in which said clutch member is conically shaped.

4. A self leveling transit level as claimed in claim 2 in which said clutch socket is substantially cylindrically shaped and said spring means is a spring around the outside of said clutch socket.

* * * * *